(12) United States Patent
Hoskins et al.

(10) Patent No.: US 11,574,316 B1
(45) Date of Patent: Feb. 7, 2023

(54) SYSTEMS AND METHODS FOR AN ACCOUNT CAPABILITIES FRAMEWORK

(71) Applicant: Stripe, Inc., San Francisco, CA (US)

(72) Inventors: Andrew G. Hoskins, Burlingame, CA (US); Jay Shah, New York, NY (US); Matthew William Janiga, South San Francisco, CA (US); Peter Cronin Terrill, San Francisco, CA (US)

(73) Assignee: STRIPE, INC., San Fransicso, CA (US)

( * ) Notice: Subject to any disclaimer, the term of this patent is extended or adjusted under 35 U.S.C. 154(b) by 224 days.

(21) Appl. No.: 16/791,876

(22) Filed: Feb. 14, 2020

(51) Int. Cl.
*G06Q 20/02* (2012.01)
*G06Q 30/018* (2023.01)
*G06Q 30/0601* (2023.01)
*G06F 9/54* (2006.01)
*H04L 67/306* (2022.01)
*G06F 16/2455* (2019.01)

(52) U.S. Cl.
CPC .............. *G06Q 30/018* (2013.01); *G06F 9/54* (2013.01); *G06F 16/24558* (2019.01); *G06Q 20/02* (2013.01); *G06Q 30/0609* (2013.01); *H04L 67/306* (2013.01); *G06Q 30/0617* (2013.01)

(58) Field of Classification Search
CPC ..................................................... G06Q 20/02
See application file for complete search history.

(56) References Cited

U.S. PATENT DOCUMENTS

2010/0051691 A1* 3/2010 Brooks ................... G07F 7/082
235/487

* cited by examiner

*Primary Examiner* — Edward Chang
(74) *Attorney, Agent, or Firm* — Womble Bond Dickinson (US) LLP

(57) ABSTRACT

A method and apparatus for managing capabilities of an account of a user system at a commerce platform are described. The method may include receiving, at the commerce platform, a request from a user system that identifies an account at the commerce platform and includes a capability requested for the account, where the requested capability corresponds to a desired functionality of the account. The method may also include mapping the requested capability to a compliance plan that defines a set of account data to be collected before activation of the capability for the account by the commerce platform. Furthermore, the method may include transmitting a message, generated by the commerce platform, that comprises a listing of additional data to be provided by the user system before activation of the capability for the account, where the additional data comprises a minimal set of account data defined by the compliance plan less any data already associated with the account at the commerce platform. The method may also include, in response to receiving, by the commerce platform, at least one response from the user system that includes the additional data, activating the capability for the account.

17 Claims, 7 Drawing Sheets

SYSTEMS AND METHODS FOR AN ACCOUNT CAPABILITIES FRAMEWORK

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the merchant, agent, and other users establishing accounts with the commerce system on behalf of the merchant. Once the accounts are established, merchants can run financial transactions using the services of the commerce system for services performed by their agents, the agents receive monetary remuneration for the services provided, and the commerce system processes the payments, performs payouts for services rendered, as well as other financial processing services. This processing may include running credit cards, crediting a merchant account for the transaction, paying out the agent responsible for the transaction on the merchant's behalf, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

Despite the different roles that the merchant and the agent have with respect to the services provided to the customer, each has an account at the commerce platform. During account creation, a merchant representative provides necessary account information to the commerce platform. Similarly, the agent will also provide necessary account information to the commerce platform. Requiring each type of account, despite their different roles and abilities is often burdensome on one or more of the parties involved. For example, account data required to be collected from a merchant will often be significantly more than account data required to be collected from an agent of merchant.

Thus, establishing accounts, often referred to as onboarding, for new users to a commerce system is often associated with significant problems and potentially presents barriers to onboarding a new user. For example, account information across all account types for a commerce platform consists of a significant number of individual pieces of data, such as names, addresses, directorships, ownership, banking information, credit card information, citizenship, government identifiers, social security numbers, tax identification numbers, and so on. Each of these types of information may not be relevant to all account types, and thus requiring a user to provide non-relevant data may unnecessarily complicate and extend the onboarding process. Furthermore, allocation of memory resources and dedication of computing resources to collection of potentially irrelevant account information leads to poor resource utilization at the commerce platform. Thus, the efficiency of onboarding may be low, may consume excess computing and network bandwidth, and may result in transfer of sensitive user information that is not necessary for the establishment of an account.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
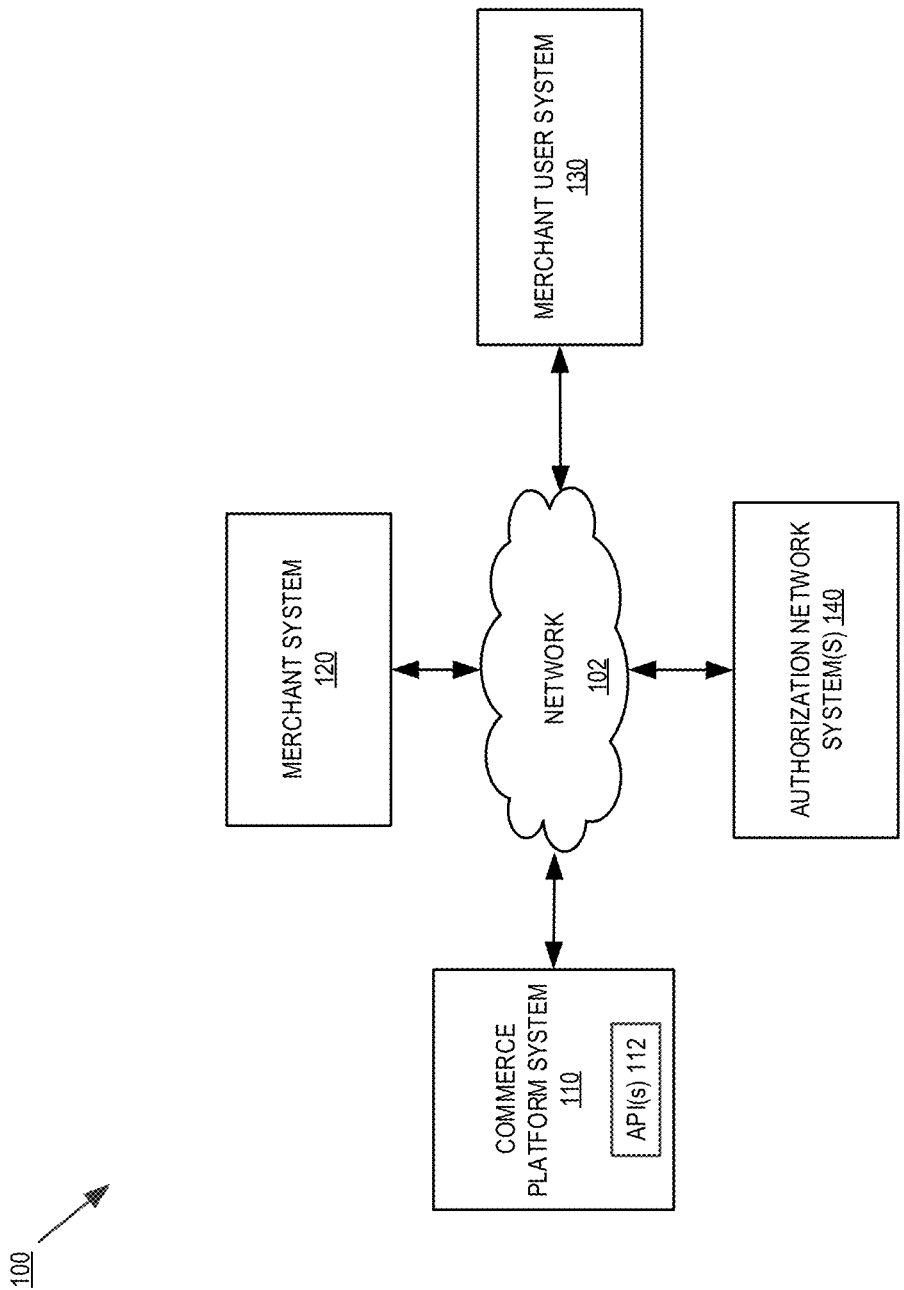
FIG. 1 is a block diagram of an exemplary system architecture for an account capabilities framework of a commerce platform.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "mapping", "transmitting", "activating", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for an account capabilities framework of a commerce platform. In one embodiment, the system 100 includes a commerce platform system 110, a merchant system 120, a merchant user system 130, and one or more authorization network system(s) 140. In one embodiment, one or more systems (e.g., systems 120, 130, and/or 140) may be mobile computing devices, such as a smartphone, tablet computer, smartwatch, etc., as well computer systems, such as a desktop computer system, laptop computer system, server computer systems, etc. The commerce platform system 110, merchant system 120, and authorization network system(s) 140 may also be one or more computing devices, such as one or more server computer systems, desktop computer systems, etc.

Furthermore, although not shown, the embodiments discussed herein may be utilized by a plurality of merchant systems and merchant user systems, which may interact with the commerce platform system 110, as discussed in greater detail herein. However, to avoid obscuring the embodiments discussed herein, only the merchant system 120 and merchant user system 130 are shown, but the embodiments discussed herein are not so limited.

The commerce platform system 110, merchant system 120, merchant user system 130, and authorization network system(s) 140 may be coupled to a network 102 and communicate with one another using any of the standard protocols for the exchange of information, including secure communication protocols. In one embodiment, one or more of the commerce platform system 110, merchant system 120, merchant user system 130, and authorization network system(s) 140 may run on one Local Area Network (LAN) and may be incorporated into the same physical or logical system, or different physical or logical systems. Alternatively, the commerce platform system 110, merchant system 120, merchant user system 130, and authorization network system(s) 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more of merchant system 120, merchant user system 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™. However, before providing such services, the merchant system 120, merchant user system 130, and/or an authorization network system 140 participate in an onboarding process in which a user of the merchant system 120, merchant user system 130, and/or the authorization network system 140 interacts with the commerce platform 110 to provide account data. Such account data includes, for example, an account type, an account owner, an account name, authorized users, banking information, credit processing information, tax identification numbers preferences, corporate director information, social security numbers, etc.

In embodiments, commerce platform system 110 further enables an account being onboarded, and/or managed after initial onboarding, the ability to specify/request one or more capabilities for the account. In an embodiment, a capability is a functionality that defines one or more operations that the account may perform using the services of the commerce platform system 110. For example, possible capabilities provided by commerce platform system 110 to accounts may include card payments capabilities (e.g., an account having this capability may process its own payments whereby a charge statement lists the system/entity holding the account), transfer capabilities (e.g., an account having this capability can transfer funds between accounts of the commerce platform), tax reporting capabilities (e.g., an account may need to provide tax accounting information for associated accounts, which the commerce platform system 110 may gather on behalf of the account holder), as well as other capabilities including geographically based capabilities (e.g., Japanese transfer capabilities, Malaysian transfer capabilities, etc.), transaction type capabilities (e.g., capital capabilities, fundraising capabilities, etc.), etc. Because the capabilities are different and provide different functionalities, there may be different data collection requirements associated with the different capabilities. That is, not all possible types of account information are required in order to utilize different services of the commerce platform system 110 associated with different capabilities. Thus, in embodiments, a minimum set of account data, which is less than all possible account data collectable by the commerce platform 110, may be associated with the requirements of an account capability provided by the commerce platform system 110.

In one embodiment, the requirements associated with each capability are defined by a compliance plan. In embodiments, a compliance plan is a listing of account data, a set of rules, etc. in a text file, database object, programming object, or other representation that defines the account data required to be collected for an associated capability in order for an account to utilize the capability. The requirements associated with a capability, as defined in an associated compliance plan, are defined by the commerce platform system 110 based on statutory requirements, legal requirements, requirements imposed by authorization network system(s) 140 which commerce platform system 110 may utilize to perform a capability's functions (e.g., Card Brand X may require certain account data in order to allow card based transactions to be cleared through Card Brand X systems by commerce platform system 110), business requirements including data determined to be relevant due to risk analysis and underwriting, etc. However, the account data requirements specified for a given capability represent the minimum set of information that is needed to be collected by the commerce platform system 110 in order to activate the capability for the associated account. In other words, a subset of all possible account data given a capability of an account being established/managed may be associated with a compliance state for a new account such that once a minimum of the account data that brings the new account into the compliance state is received by the commerce platform 110 during account onboarding or management, the account is enabled to use the services of the commerce platform 110 associated with that capability.

In embodiments, capabilities are not exclusive, and a single account may be associated with one or more capabilities. Furthermore, capability(s) initially associated with an account may be removed at a later time, and similarly new capabilities may be added to accounts at any time. Therefore, individual accounts may be associated with their own sets of capabilities based on the type and intended usage of those accounts, and the capabilities associated with an account may change over time.

For example, merchant system 120 may be a food delivery service that utilizes the commerce platform system 110 to run financial transaction, account for card based transactions taken by the merchant system 120, manage tax reporting for an agent of the merchant (e.g., merchant user system 130), and pay out an agent of the merchant (e.g., merchant user system 130) for services rendered by the agent on behalf of the merchant system 120. The agent system, however, may be associated with an individual user (i.e., the agent) that provides the services of the merchant system, such as pick up and delivery of food. The agent, however, does not handle customer financial data, and instead only receives pay outs from the merchant system 120 upon completion of specific tasks performed on behalf of the merchant system 120. In this example scenario, the function and therefore capabilities that each commerce platform account (e.g., an account of the merchant system 120 and an account of the merchant user system 130) utilize are different in order to carry out their respective duties. The merchant system 120, in this example, users more commerce platform capabilities, which are associated with more data collection requirements in order to bring the capabilities into a compliance state given all of the associated capability based compliance plans. The merchant user system 130, which uses fewer commerce platform capabilities, would be associated with fewer data collection requirements.

It would not be efficient, both in terms of account onboarding/management compute resources, as well as memory allocation, to require the same set of data given the different capabilities. Furthermore, completion rates of account onboarding are reduced the more onerous the account data collection is (e.g., an individual user is not likely to follow through with account creation if data collection is too extensive and/or intrusive). Continuing the example above, the platform providing food delivery services will want access to use more commerce platform capabilities that are each associated with different account data collection requirements, while the agent actually making food delivery and only receiving payouts is associated with fewer capabilities and less stringent data collection requirements.

Therefore, in embodiments and as discussed in greater detail below, commerce platform system 110 provides a capabilities application programming interface, illustrated as API(s) 112, that represent software functions, libraries, defined messaging protocols (e.g., format, data types, fields, etc.), etc. for requesting capabilities, providing data collection requirements based on capability type, and requesting/unrequesting capabilities for a given account. In an embodiment, the API(s) 112 are executed by processing endpoints of the commerce platform system 110, and functions supported by the API(s) 112 are distributed to merchant system 112 for integration into the interface(s) (e.g., a graphical user interface/application executing on merchant system 120 and/or distributed to agents, such as merchant user system 130) and other control systems of the merchant system(s). For example, merchant system 120 may integrate messaging functions of the API(s) 112 into its software applications/interfaces that seek to onboard new users, for example those using a merchant app executed by merchant user system 130. In this example, the merchant system 120 would interact with the commerce platform on behalf of the merchant user system 130 to, for example, request capabilities by API based messaging between merchant system 120 and API(s) 112. Then, based on requirements returned in API based messaging responses, merchant system 120 would seek to collect the required data from the user of merchant user system 130. Alternative, a direct user interface, such as a dashboard user interface served by the commerce platform system 110, could be used to interact/collect data from merchant system 110 and/or merchant user system 130, as well as to manage accounts including requesting and unrequesting capabilities.

Once data collection requirements for a given set of capabilities is satisfied, the new/updated account at the commerce platform 110 has provided the minimum set of account data necessary to satisfy the minimum compliance state for the capabilities associated with the account. When the account is brought into compliance for a given capability, API(s) 112 will activate the capability for the account. The account holder may then run transactions within the account's activated capabilities using the commerce platform system 110. Continuing the example above, the merchant system 120 could take in card payment data from its customers and use the commerce platform system 110 to run transactions (e.g., authorize, clear, seek payment from etc.) with authorization network system(s) 140. Similarly, a successful transaction and service provided by merchant user system 130 may result in commerce platform system 110 effecting a transfer of funds to an account established for a user of the merchant user system 130. Merchant user system 130 and/or merchant system 120, however, would not be able to utilizes the services of commerce platform 110 for which capabilities have not yet been activated.

As discussed herein, commerce platform system 110 utilizes capabilities for accounts to improve the efficiency of account onboarding and management by providing a granular level of different and unique capabilities (e.g., accounts need not have all capabilities, and different mixes of capabilities can be provided based on different account holder needs), each mapped to their own data collection requirement defined in associated compliance plans. Thus, based on requested capabilities, a minimum set of data associated with the requested capabilities is collected, and non-relevant data is not collected, thereby providing for faster onboarding and account creation by commerce platform system 110. Furthermore, by minimizing the data collection requirements using account capabilities, data privacy is improved by reducing the electronic transmission of account data to only the required account data. As a further beneficial result, network bandwidth consumption and compute resources are reduced by minimizing the account data collection requirements.

Figure 2:
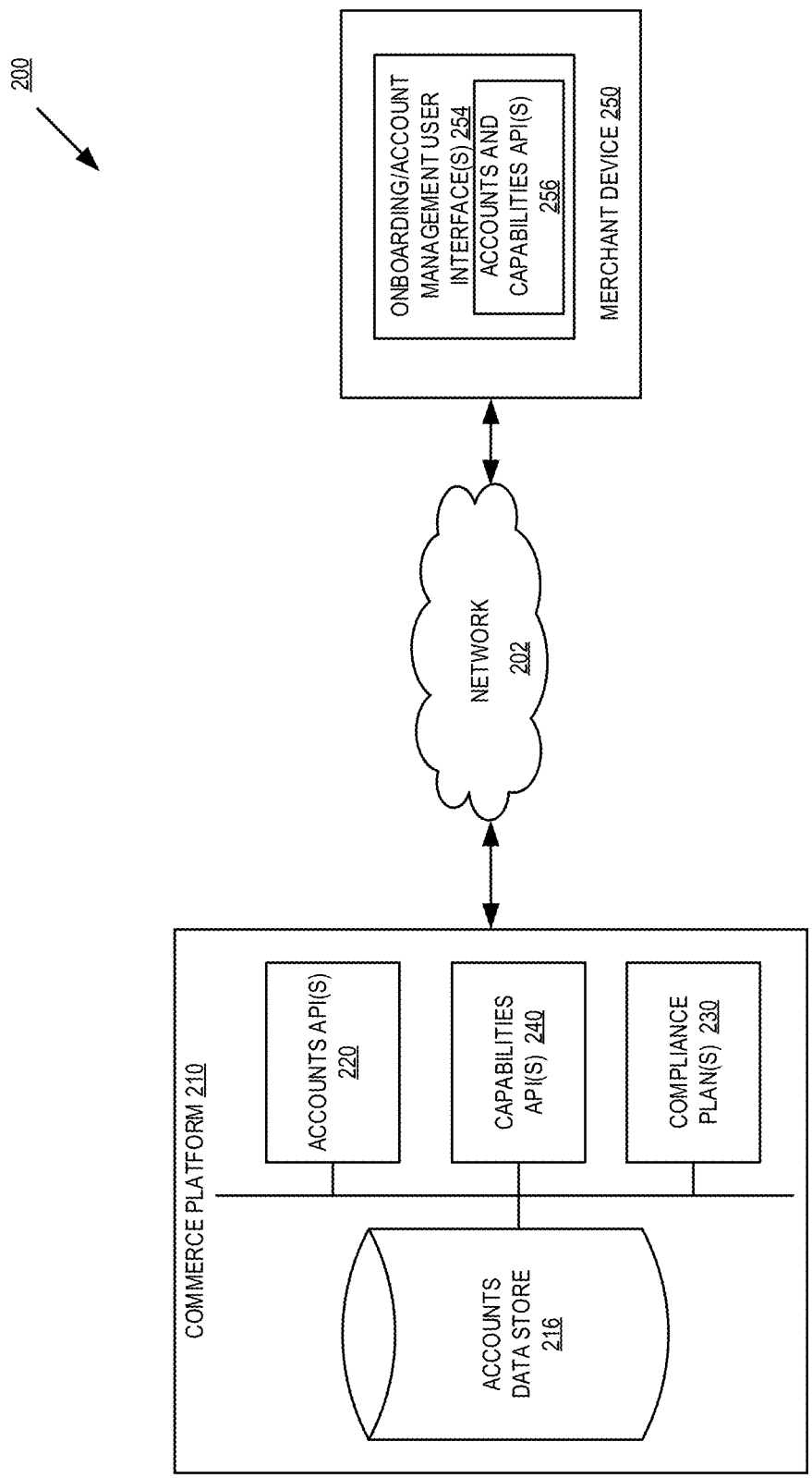
FIG. 2 is a block diagram of one embodiment of a commerce platform providing account capabilities to a merchant system.

FIG. 2 is a block diagram of one embodiment of a commerce platform 210 providing account capabilities to a merchant device 250. Commerce platform 210 and merchant device 250 provide additional details for the corresponding devices/systems discussed above in FIG. 1.

In one embodiment, commerce platform 210 includes accounts API(s) 220, capabilities API(s) 240, one or more compliance plans 230, and an accounts data store 216. Although not shown, commerce platform 210 may include other systems to, for example, perform transactions and other services provided by the commerce platform 210.

Merchant device 250, which may be any of merchant system 120, merchant user system 130, or authorization network system 140 as discussed above in FIG. 1, includes onboarding/account management user interface(s) 254 rendered by the user device merchant device 250, for example within a web browser, mobile web browser, application, etc. running on merchant device 250. In embodiments, the user interface(s) 254 are integrated with functions and objects provided by accounts and capabilities API(s) 256. For example, onboarding/account management user interface(s) 254 may utilize one or more software packages distributed by commerce platform that implement API based messaging as well as other commerce platform system functions, as discussed herein.

As discussed above, merchant device 250 will initiate the establishment of an account having one or more capabilities with commerce platform 210, to enable the use of services provided by the commerce platform 210 by the new account. Similarly, for an established account, merchant device 250 may seek to manage the account by, for example, adding and/or removing capabilities from the account. That is, the account onboarding and/or management may include any combination of new account creation, an expansion of capabilities for an existing account, a removal of capabilities for an account, etc.

In embodiments, the commerce platform 210 and merchant device 250 communicate with each other over various networks and network configurations as discussed above in FIG. 1. Furthermore, the communications may utilize secure communications protocols in order to safeguard any sensitive data exchanged between the systems.

In an embodiment, accounts API(s) 220 is responsible for receiving an initial request from onboarding/account management user interface(s) 254, such as an API 256 generated request to create a new account. Although the discussion herein equally applicable to managing an existing account, the below discussion focuses on account creation in order to describe various embodiments, and not to limit the embodiments herein. In an embodiment, the new account is allocated in accounts data store 216 by accounts API(s) 220 and, for example, may be associated with account identifiers, encryption keys, etc. Furthermore, initial account data, such as account name, contact numbers, etc. may also be provided for the new account being established.

In an embodiment, and as discussed herein, the user interface(s) 254 may further enable selection of one or more capabilities for a new account. In embodiments, the capabilities selection may be provided in a graphical user interface, as illustrated in account management window 350 of FIG. 3A. In the window 350, the account capabilities of card payments and transfers are selected for the account, while the tax reporting capability is not selected. When submitted in FIG. 3A, the accounts and capabilities API(s) 256 generates example API request message 370 that defines requested capabilities, and provides any additional received account data in a message formatted based on the protocols defined by the capabilities API(s) 240. The illustrated message format is an example messaging format, and other messaging formats and data elements may be used consistent with the discussion herein. Message 370 is an example defining an embodiment of message content relevant to capabilities, and may include additional content. Furthermore, the API(s) 256 transmit the message to capabilities API(s) 240 of the commerce platform 210 addressed in the message. In embodiments, the capabilities API(s) 240 are executed by a capabilities endpoint 310, which parses the message to determine what capabilities have been requested by locating and determining a capabilities parameter and type within the message 370.

Figure 3A:
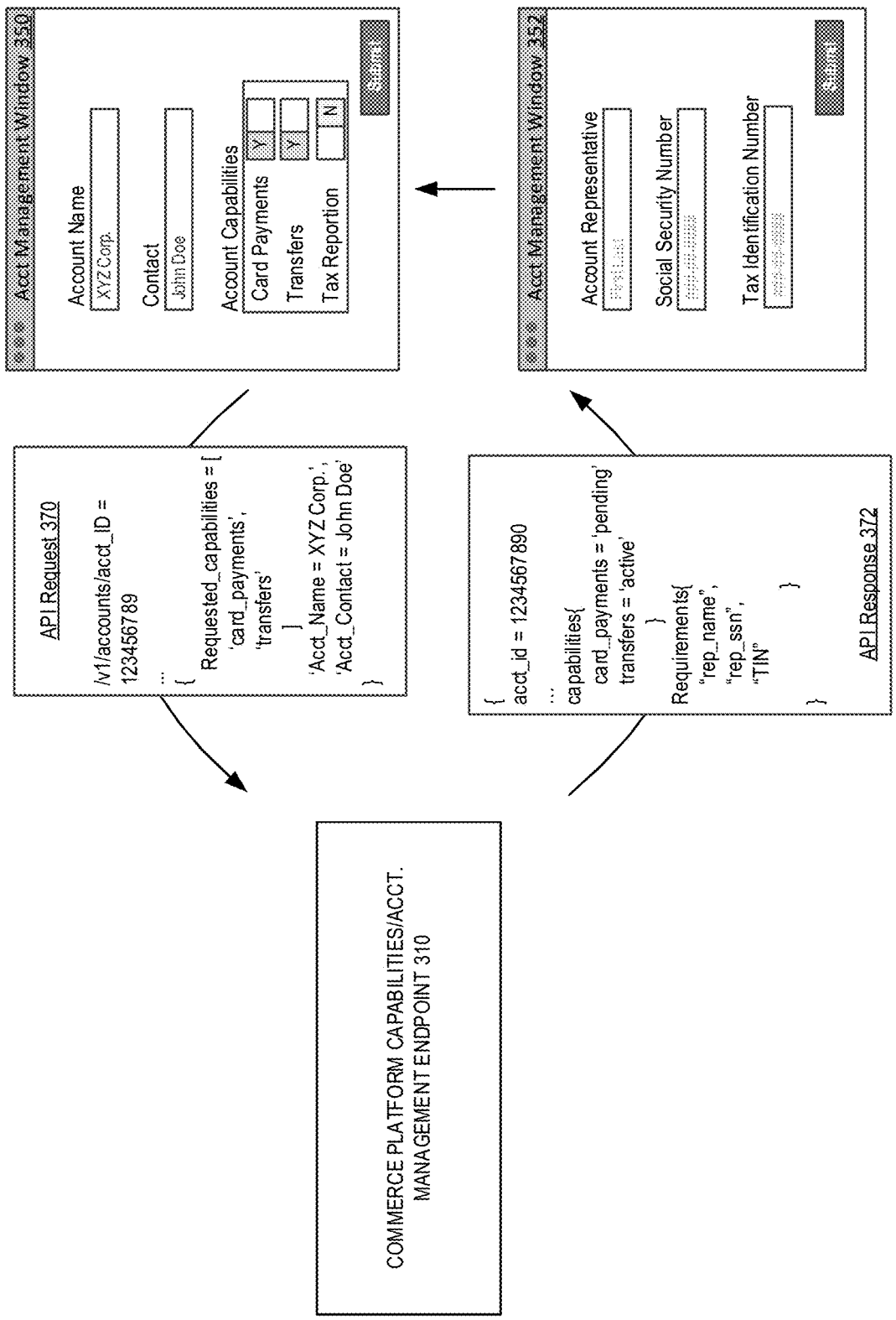
FIG. 3A is a block diagram of a API based interaction between a merchant system and a commerce platform for capabilities management.
Figure 3B:
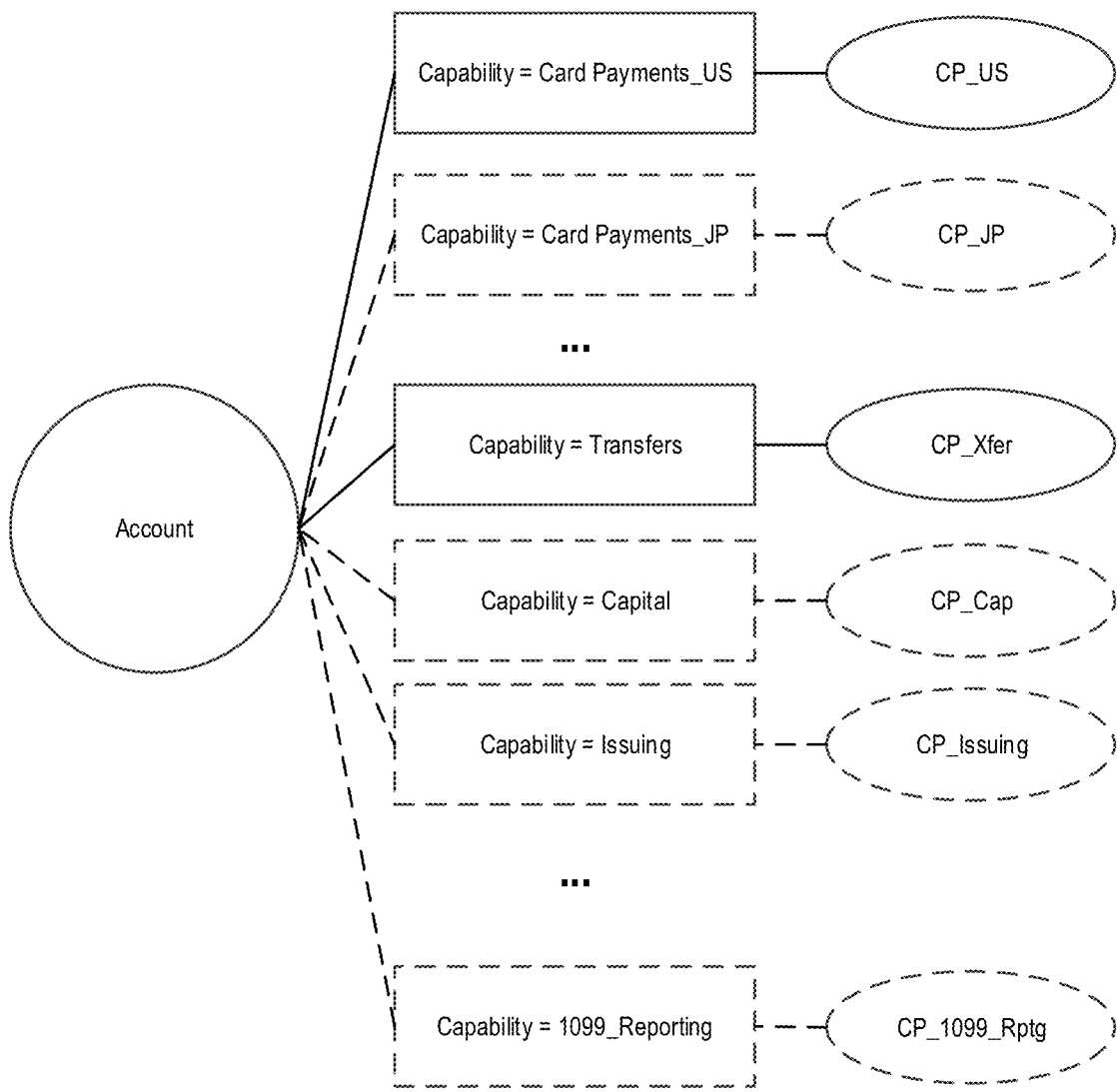
FIG. 3B is a block diagram illustrating an embodiment of a model of account capabilities provided by the commerce platform.

In the API request 370 illustrated in FIG. 3A, the requested capabilities are 'card_payments' and 'transfers'." In an embodiment, the capabilities endpoint 310 allocates objects for the requested capabilities (e.g., card_payments and transfers) of the account (e.g., acct_ID 123456789 for XYZ Corp.) to the requested capabilities, where the capability objects are each mapped to associated compliance plans (e.g., rules and data defining the minimum set of data to be collected to activate the capability based on associated regulations, authorization network system requirements, etc.). For example, FIG. 3B illustrates a model of account capabilities provided by the commerce platform mapped to associated compliance plans. In the model, card payments in the U.S. and transfers are added to the account, while other potential capabilities are not (as indicated by the dashed line). Furthermore, the objects for the added capabilities are mapped to their associated compliance plans that define the minimum data that is required to be collected by the commerce platform in order to activate the associated capability.

Figure 3C:
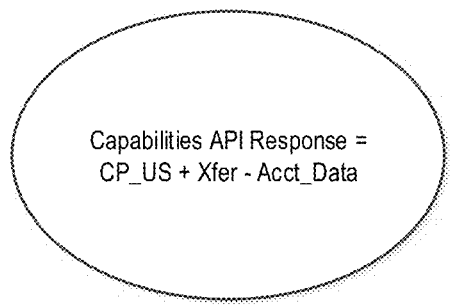
FIG. 3C is a block diagram illustrating an embodiment of merged account capabilities requirements from the model of account capabilities provided by the commerce platform.

In embodiments, the capabilities endpoint 310 determines the minimum set of data associated with the requested capabilities when generating API response message 372. As illustrated in FIG. 3C, the minimum set of information is the union of the data required by each mapped compliance plan (e.g., card payments US and transfers) minus any relevant account data that can be surfaced from accounts data store 216. In embodiments, existing relevant account data includes account data that has already been provided or is known to the commerce platform 210, and is also data that is to be collected by the union of the mapped compliance plans. Thus, capabilities endpoint 310 is able to determine the minimum set of information for the combined required data to be collected to active the requested capabilities, and remove any known information, when generating API response 372 to still further reduce data collection requirements. Furthermore, it may be the case that one or more of the requested capabilities are satisfied based on information already known by the commerce platform 210 and available in accounts data store 216. This information is returned by capabilities endpoint 310 in API response message 372, including indicating a status of the capabilities and any outstanding data collection requirements. In API response 372, 'transfers' is illustrated as 'active' indicating the data collection requirements in the compliance plan have been satisfied, while 'card_payments' is 'pending' indicating that further data is to be collected in order to activate that capability. Furthermore, the API response 372 includes a requirements hash indicating one or more additional data to be collected in order to meet the minimum data collection requirements, which are illustrated in the example as a representative name, the representative's social security number, and a tax identification number. These data fields are merely examples, as each capability will have specific data collection requirements as defined by legal, statutory, business, risky analysis, underwriting, or other rules.

When the interface(s) 254 receive this message from the capabilities endpoint 310 executing at capabilities API(s) 240 of commerce platform 210, the functions of the accounts and capabilities API(s) embedded in the interface(s) may parse the message and render a further interface 352 to collect the needed information to satisfy the capabilities requirements. As illustrated in FIG. 3A, the process may continue (e.g., submitting account information and/or receiving capability status updates and requirements) until account requirements for the requested capabilities are satisfied.

In embodiments, the surfacing of account information and determination of a minimum combined data requirement for a set of capabilities enables both granular account configuration (e.g., specification of specific capabilities of each account maintained by commerce platform 210), and more efficient account onboarding/management by reducing data collection requirements, sensitive account information exchanged between systems, compute cycles needed to generate and process exchanged messages, etc. to make a more efficient onboarding and account capabilities management system. Furthermore, the collection is programmatic and organized using the message exchanges discussed above so that the outstanding requirements are requested with a minimum set of data, reducing the complexity of the message exchanges and data collection interfaces.

Additionally, new capabilities can be added by the commerce platform based on the needs of its customers. For example, expansion into a new geographic region can be accommodated by adding a new capability object and mapping a compliance plan to that object. Then, the model merely expands, and not the onboarding process or onboarding paradigm. Similarly, the change to a compliance plan, for example due to new legislation, may be quickly accounted for by updating the compliance plan and proactively requesting the additional account information, such as be messaging a webhook in a merchant system. This enables existing accounts to be notified of the updated requirements, and again a minimal and efficient data collection process performed to bring accounts up to compliance, as necessary.

Figure 4:
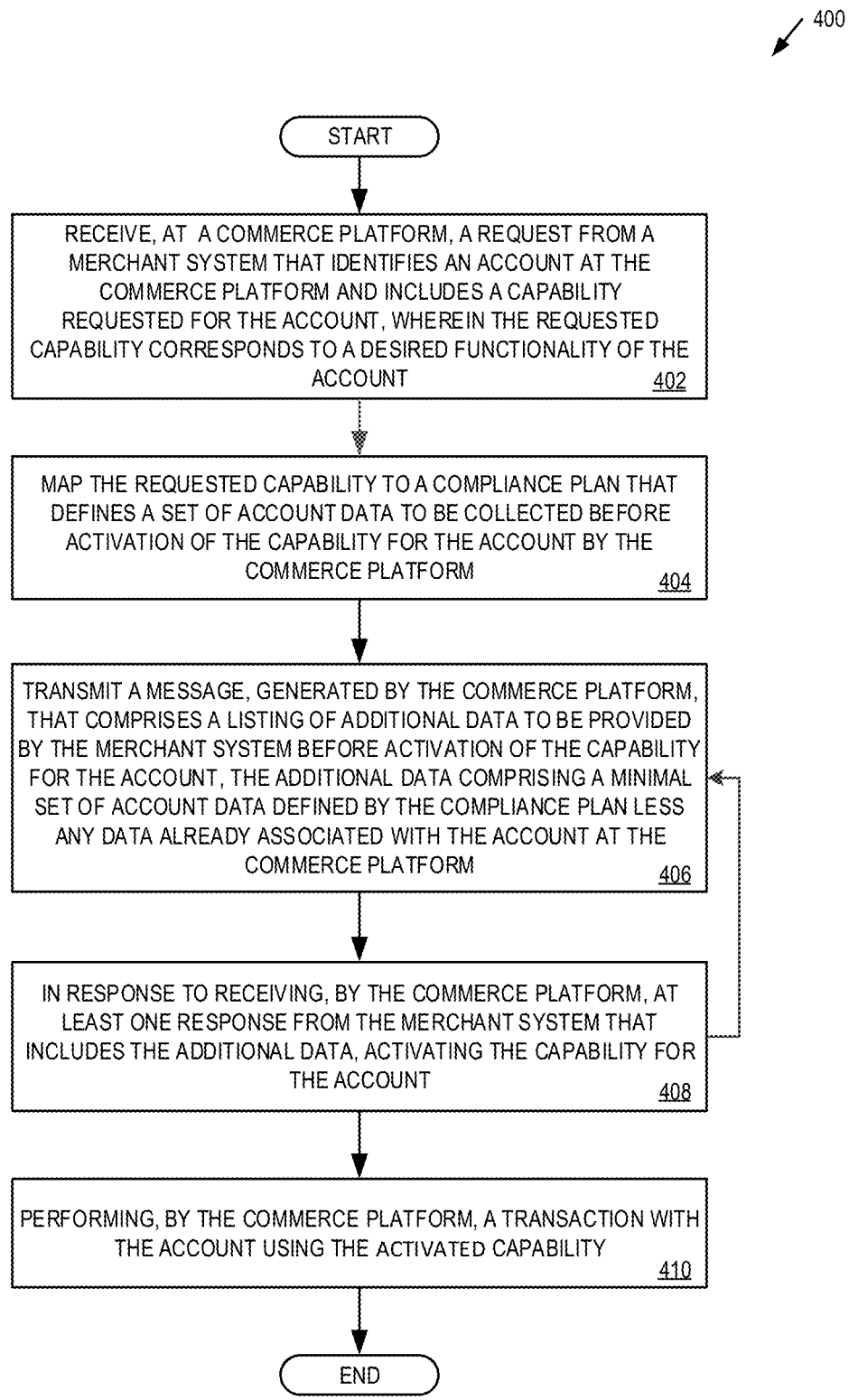
FIG. 4 is a flow diagram of one embodiment of a method for managing account capabilities for a merchant system by a commerce platform system.

FIG. 4 is a flow diagram of one embodiment of a method for managing account capabilities for a merchant system by a commerce platform system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform (e.g., commerce platform system 110, commerce platform 210, and/or capabilities endpoint 310).

Referring to FIG. 4, processing logic begins by receiving, at the commerce platform, a request from a merchant system that identifies an account at the commerce platform and includes a capability requested for the account, where the requested capability corresponds to a desired functionality of the account (processing block 402). As discussed herein, the request may be initiated as an API based message (e.g., message 370 of FIG. 3A having a format and content defined by the API), which is received by a capabilities endpoint providing processing of the API based messaging. Furthermore, the request may include additional account information, such as a type of account to be established, name of the account, login credentials, etc. In embodiments, more than one capability may be requested, and can include various capabilities such as transfers (e.g., transfer funds between commerce platform accounts), card payments (e.g., accept card transactions where card data is collected by the account holder and not the commerce platform), tax reporting (e.g., gathering tax related information for accounts), capital (e.g., gathering information for establishing capital accounts, issuing (e.g., gathering information for issuing financial accounts, credit, offers, etc.), as well as other account capabilities.

Processing logic then maps the requested capability to a compliance plan that defines a set of account data to be collected before activation of the capability for the account by the commerce platform (processing block 404). As discussed herein, the compliance plan is a file, object, etc. that includes rule and/or specific listed data that is required to be collected in order for an account to activate a given capability. Because the capabilities are different, there are different compliance plans for each capability. Furthermore, each compliance plan may be associated with data collection requirements of legal systems, card brand systems, clearance systems, risk analysis systems, etc. Thus, each compliance plan is a tailored minimal set of data to be collected in order to activate that compliance plan. Therefore, for an account in which several capabilities are requested, corresponding compliance plans are each mapped to that account.

Processing logic transmits a message, generated by the commerce platform, that comprises a listing of additional data to be provided by the merchant system before activation of the capability for the account, where the additional data comprises a minimal set of account data defined by the compliance plan less any data already associated with the account at the commerce platform (processing block 406). In embodiments, where two or more capabilities are requested, processing logic can take the union of the required data collection by taking the required data to be collected for each capability based on the mapped compliance plans, removing duplicate data, and further removing any data already known to the commerce platform. Thus, any overlapping data or data that is already known to the commerce platform, can be removed from the response message. Beneficially, the set of account data is less than all possible collectible account data. Furthermore, in embodiments, the response message is also an API based message having a format and content specified by the API (e.g., response 372 having a requirements hash providing a listing of the additional data), which in embodiments causes a user interface of the merchant system to display the request for the additional data.

In response to receiving, by the commerce platform, at least one response from the merchant system that includes the additional data, processing logic activating the capability for the account (processing block 408). In embodiments, the process may return to processing block 406 to collect any additional account information via the API based messaging discussed herein. Furthermore, processing logic may return to processing block 406 to transmit a response message indicating the activation of the capability.

Processing logic may then perform, by the commerce platform, a transaction on behalf of the account using the activated capability (processing block 410). As discussed herein, the operations provided by the commerce platform to account holders varies. Thus, processing logic may check the status of a capability for a requested operation by an account holder, and when the capability is active, performs the requested operation (e.g., transfers funds, runs a transaction, collects tax documentation, etc.)

Figure 5:
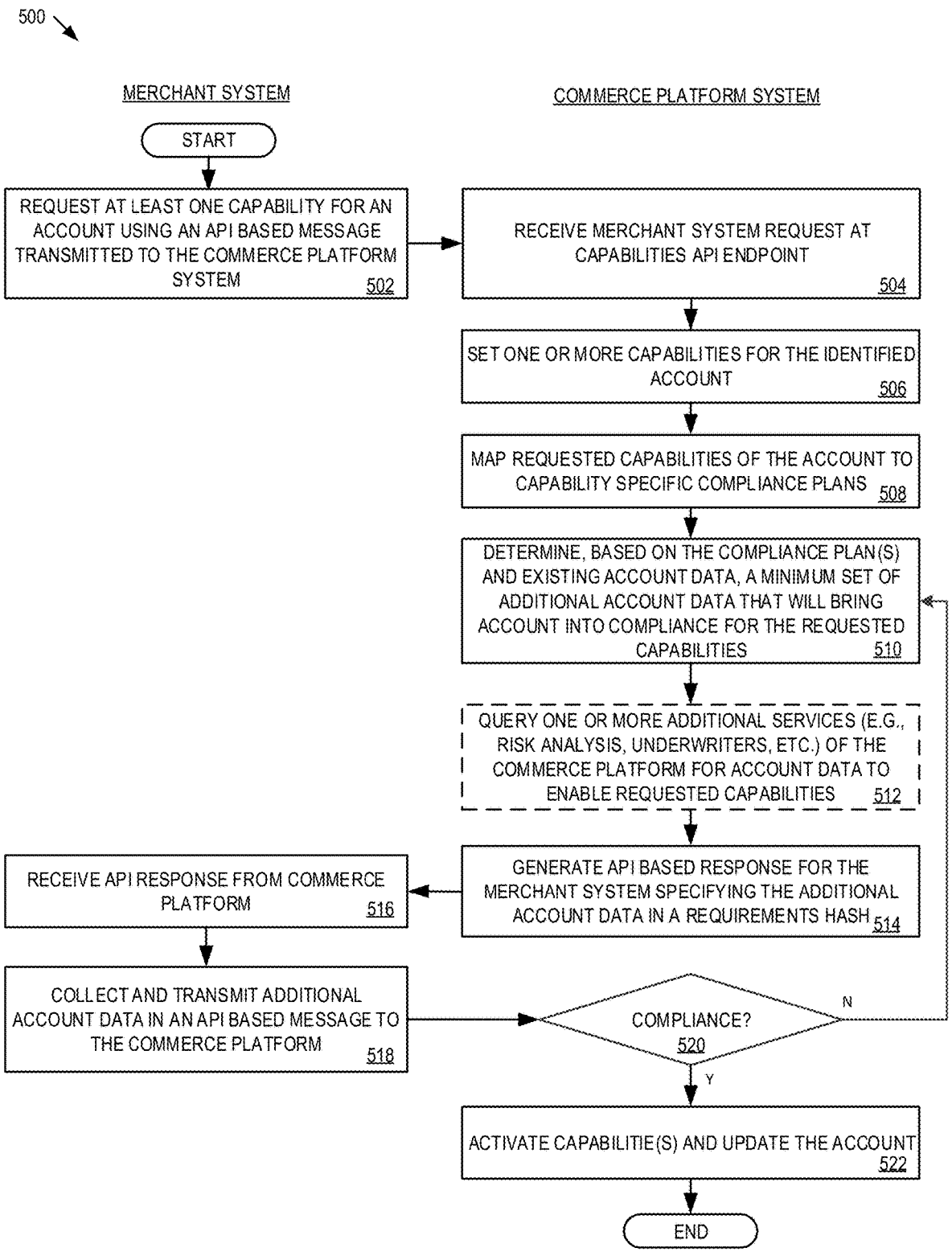
FIG. 5 is a flow diagram of another embodiment of a method for managing account capabilities for a merchant system by a commerce platform system.

FIG. 5 is a flow diagram of another embodiment of a method 500 for managing account capabilities for a merchant system by a commerce platform system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform (e.g., commerce platform 110, 210, 310) and a merchant system (e.g., merchant system 120, 250, merchant user system 130, or authorization network system 140). However, to avoid obscuring the embodiments of the present invention, the below discussion will be directed to capabilities management for a merchant account by a merchant system.

Referring to FIG. 5, processing logic of a merchant system begins by requesting at least one capability for an account using an API based message transmitted to the commerce platform system (processing block 502). In an embodiment, API based message may be generated by processing logic of the merchant system including commerce platform API functions embedded into processing logic. Furthermore, the request may be accompanied by account details, such as a user name, encryption key, account identifier, etc. enabling the commerce platform to identify an existing account and/or allocate a new account.

Processing logic of the commerce platform system receives the merchant system request at a capabilities API endpoint (processing block 504). The endpoint may be the endpoint addressed in the message generated at block 502, and may be a network addressable endpoint configured to receive API based messaging. Processing logic sets one or more capabilities for the identified account (processing block 506). In embodiments, the API based request message may be parsed to locate a capabilities request with parameters defining the capability type(s) being requested.

Processing logic maps the requested capabilities of the account to capability specific compliance plans (processing block 508). The compliance plans, as discussed herein, are each associated with a respective capability such that each compliance plan specifies the minimum set of data required to be collected for activation of the capability. For example, the card payments capability may require more stringent and expansive data collection than the transfers capability. The data collection requirements specified by each compliance plan are defined by the commerce platform based on legal requirements, statutory requirements, card authorization network requirements, geographic requirements, etc.

Processing logic determines, based on the compliance plan(s) and existing account data, a minimum set of additional account data that will bring the account into compliance for the requested capabilities (processing block 510). As discussed above with respect to FIG. 3C, the minimum set of data is the union of the data requirements of each compliance plan minimum any account data that can be surfaced by the commerce platform (e.g., stored in an accounts data store or accessible by the commerce platform).

Optionally, the commerce platform queries one or more additional services (e.g., risk analysis, underwriting, or other services) of the commerce platform for account data to enable requested capabilities (processing block 512). That is, for a given capability, a risk analysis may be performed to determine if the account being managed, based on the available information, represents a good risk or a bad risk, and what information may be needed to change a bad risk into a good risk. Such a risk analysis system may be a machine learning based risk analysis system that analyzes factors such as location, credit scores, capability, transaction history, etc. Similarly, underwriter systems may be queried to determine any additional information needed by such systems not reflected in a compliance plan.

Processing logic generates an API based response for the merchant system specifying the additional account data (processing block 514). As discussed herein, the response message is formatted to include a requirements hash listing the required additional account data. In embodiments, the requirements hash may specify additional requirements, such as data due now, data due soon, data collection deadlines, etc.

Processing logic of the merchant system receives the response from the commerce platform (processing block 516). As discussed herein, the merchant system includes API functions distributed by the commerce platform that can read the requirements hash, and populate one or more user interface(s) to collect the outstanding data, and transmit the additional data in an API based message to the commerce platform (processing block 518).

The commerce platform analyzes the merchant's response message, including any data collected by the merchant system to determine if compliance has been achieved for one or more of the requested capabilities (processing block 520). When there are additional data collection requirements outstanding for one or more capabilities, the process returns to processing block to request any additional data for the requirement. However, when compliance is achieved for at least one capability, processing logic activates the capability and updates the account (processing block 522). Because capability data collection requirements may be received at different times, processing logic may both activate a capability by advancing to processing block 522 with respect to that capability, while at the same time return to processing block 510 to continue data collection. However, in the response message generated at block 514, the satisfied capability would show the updated status.

Although discussed in the context of merchant account establishment, the processes of FIGS. 4 and 5 may be used to onboard and/or manage other types of accounts (e.g., agent accounts, banking accounts, authorization network accounts, capital accounts, brokerage accounts, charitable accounts, etc.), as well as accounts for other non-commerce related systems. The techniques herein are extensible to other systems in which accounts may be customized using different capabilities.

Figure 6:
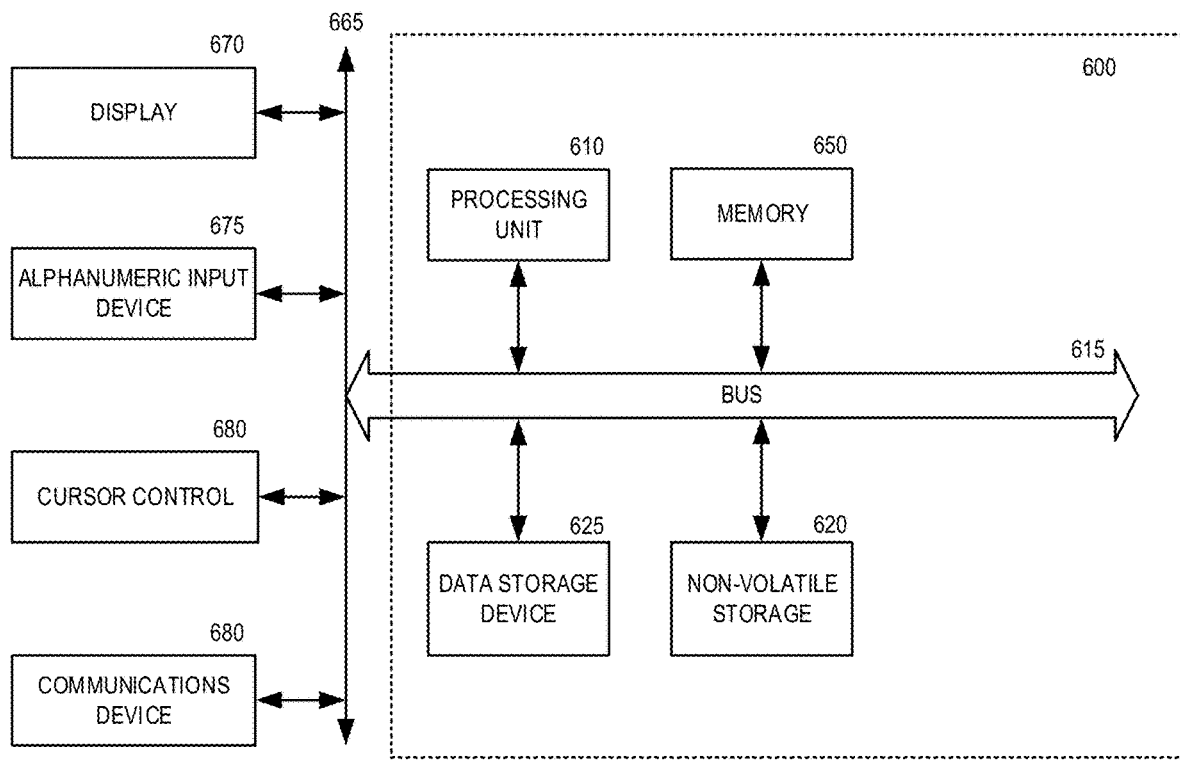
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant system, an authorization network system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
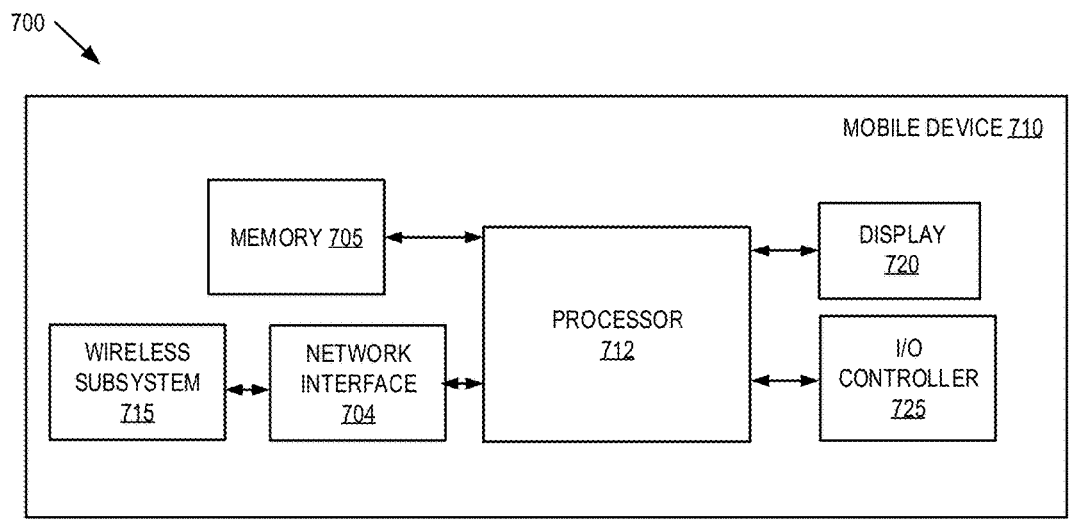
FIG. 7 is one embodiment of a mobile device that may be used to support the systems and operations discussed herein.

FIG. 7 is block diagram of one embodiment 700 of a mobile device. Mobile device 710 may be used, for example, as a merchant user device when interacting with the commerce platform system during capabilities.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for managing capabilities of an account of a user system at a commerce platform, the method comprising: receiving, at an application programming interface (API) endpoint of the commerce platform over a network, an electronic message that comprises a request from a user system that identifies an account at the commerce platform and includes a capability requested for the account, where the requested capability corresponds to a desired functionality of the account and wherein the request is a message having a format and content defined by an API of the commerce platform; mapping, by the commerce platform, the requested capability to a compliance plan that defines a set of account data to be collected for the account by the commerce platform and further defines a minimal set of account data to be collected before activation of the capability; generating by the API endpoint of the commerce platform, a second electronic message having the format and content defined by the API of the commerce platform, wherein the second electronic message comprises a requirements hash having data indicative of additional account data being the minimal set of account data less any data already associated with the account at the commerce platform; transmitting the second electronic message, generated by the commerce platform and transmitted over the network, comprising the requirements hash, wherein the requirements hash is parsed by one or more API functions to determine the additional account data and render one or more user interfaces that display a listing of the additional account data to be provided by the user system before activation of the capability for the account; and in response to receiving, by the commerce platform over the network, at least one response electronic message from the user system that includes the additional data, activating, by a processing logic of the commerce platform, the capability for the account.

2. The method of claim 1, wherein the capability requested for the account comprises two or more different capabilities.

3. The method of claim 2, further comprising:
mapping each capability to a compliance plan associated with said each capability;
determining account data for each capability based on the mapped compliance plans;
determining a remaining data requirement as a union of the account data for each capability less account data known to the commerce platform; and
transmitting the second electronic message, wherein the additional data is the remaining data.

4. The method of claim 1, wherein the set of account data is less than all possible collectible account data, and wherein different capabilities are associated with different sets of account data defined by respective compliance plans.

5. The method of claim 1, wherein the user system comprises a merchant system, a merchant user system, or an authorization network system.

6. The method of claim 1, further comprising:
querying one or more additional systems of the commerce platform for account data to enable the requested capability, wherein the one or more additional systems comprise a risk analysis system and an underwriter system.

7. The method of claim 1, wherein the capability is one of a plurality of different capabilities provided by the commerce platform, each capability being associated with one or more operations that the commerce platform will perform on behalf of an account holder having said each capability.

8. A non-transitory computer readable storage medium including instructions that, when executed by a processor, cause the processor to perform a method for managing capabilities of an account of a user system at a commerce platform, the method comprising: receiving, at an application programming interface (API) endpoint of the commerce platform over a network, an electronic message that comprises a request from a user system that identifies an account at the commerce platform and includes a capability requested for the account, where the requested capability corresponds to a desired functionality of the account and wherein the request is a message having a format and content defined by an API of the commerce platform; mapping, by the commerce platform, the requested capability to a compliance plan that defines a set of account data to be collected for the account by the commerce platform and further defines a minimal set of account data to be collected before activation of the capability; generating, by the API endpoint of the commerce platform, a second electronic message having the format and content defined by the API of the commerce platform wherein the second electronic message comprises a requirements hash having data indicative of additional account data being the minimal set of account data less any data already associated with the account at the commerce platform; transmitting the second electronic message, generated by the commerce platform and transmitted over the network, comprising the requirement hash, wherein the requirement hash is parsed by one or more API functions to determine the additional account data and render one or more user interfaces that display a listing of the additional account data to be provided by the user system before activation of the capability for the account; and in response to receiving, by the commerce platform over the network, at least one response electronic message from the user system that includes the additional account data, activating, by a processing logic of the commerce platform, the capability for the account.

9. The non-transitory computer readable storage medium of claim 8, wherein the capability requested for the account comprises two or more different capabilities.

10. The non-transitory computer readable storage medium of claim 9, further comprising:

mapping each capability to a compliance plan associated with said each capability;
determining account data for each capability based on the mapped compliance plans;
determining a remaining data requirement as a union of the account data for each capability less account data known to the commerce platform; and
transmitting the second electronic message, wherein the additional data is the remaining data.

11. The non-transitory computer readable storage medium of claim 8, wherein the set of account data is less than all possible collectible account data, and wherein different capabilities are associated with different sets of account data defined by respective compliance plans.

12. The non-transitory computer readable storage medium of claim 8, wherein the user system comprises a merchant system, a merchant user system, or an authorization network system.

13. The non-transitory computer readable storage medium of claim 8, further comprising:
querying one or more additional services of the commerce platform for account data to enable the requested capability, wherein the one or more additional systems comprise a risk analysis system and an underwriter system.

14. The non-transitory computer readable storage medium of claim 8, wherein the capability is one of a plurality of different capabilities provided by the commerce platform, each capability being associated with one or more operations that the commerce platform will perform on behalf of an account holder having said each capability.

15. A system of a commerce platform that manages capabilities of an account of a user system, the system comprising: a memory that stores account data; and a processor coupled with the memory configured to: receive, at an application programming interface (API) endpoint of the commerce platform over a network, an electronic message that comprises a request from a user system that identifies an account at the commerce platform and includes a capability requested for the account, where the requested capability corresponds to a desired functionality of the account, and wherein the request is a message having a format and content defined by an API of the commerce platform, map the requested capability to a compliance plan that defines a set of account data to be collected for the account by the commerce platform and further defines a minimal set of account data to be collected before activation of the capability, generate, by the API endpoint of the commerce platform, a second electronic message having the format and content defined by the API of the commerce platform, wherein the second electronic message comprises a requirements hash having data indicative of additional account data being the minimal set of account data less any data already associated with the account at the commerce platform, transmit, over the network, the second electronic message comprising the requirements hash, wherein the requirements hash is parsed by one or more API functions to determine the additional account data and render one or more user interfaces that display a listing of the additional account data to be provided by the user system before activation of the capability for the account, and in response to receiving, by the commerce platform over the network, at least one response electronic message from the user system that includes the additional account data, activate, by processing logic executed by the processor, the capability for the account.

16. The system of claim 15, wherein the capability requested for the account comprises two or more different capabilities.

17. The system of claim 16, wherein the processor is further configured to:
map each capability to a compliance plan associated with said each capability;
determine account data for each capability based on the mapped compliance plans;
determine a remaining data requirement as a union of the account data for each capability less account data known to the commerce platform; and
transmit the second electronic message, wherein the additional data is the remaining data.

* * * * *